(12) United States Patent
Fuller et al.

(10) Patent No.: US 10,216,486 B2
(45) Date of Patent: *Feb. 26, 2019

(54) AUTOMATIC GENERATION OF LICENSE TERMS FOR SERVICE APPLICATION MARKETPLACES

(71) Applicant: International Business Machines Corporation, Armonk, NY (US)

(72) Inventors: Nicholas C. M. Fuller, North Hills, NY (US); Jim A. Laredo, Katonah, NY (US); Hui Lei, Scarsdale, NY (US); Sriram K. Rajagopal, Chennai (IN); Maja Vukovic, New York, NY (US); Liangzhao Zeng, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 154 days.

This patent is subject to a terminal disclaimer.

(21) Appl. No.: 15/245,226

(22) Filed: Aug. 24, 2016

(65) Prior Publication Data

US 2016/0364213 A1 Dec. 15, 2016

Related U.S. Application Data

(63) Continuation of application No. 14/526,852, filed on Oct. 29, 2014, now Pat. No. 9,460,273.

(51) Int. Cl.
*H04L 29/06* (2006.01)
*G06F 8/20* (2018.01)
(Continued)

(52) U.S. Cl.
CPC .......... *G06F 8/20* (2013.01); *G06F 17/30598* (2013.01); *G06F 17/30867* (2013.01); *G06F 21/105* (2013.01); *G06F 2221/0768* (2013.01)

(58) Field of Classification Search
CPC ................. G06F 8/20; G06F 17/30867; G06F 17/30598; G06F 21/105; G06F 2221/0768
See application file for complete search history.

(56) References Cited

U.S. PATENT DOCUMENTS

| | | | | |
|---|---|---|---|---|
| 5,671,412 A | * | 9/1997 | Christiano | G06Q 30/04 |
| 6,056,786 A | * | 5/2000 | Rivera | G06F 21/105 |
| | | | | 709/229 |

(Continued)

FOREIGN PATENT DOCUMENTS

| | | |
|---|---|---|
| EP | 2595078 A1 | 5/2013 |
| WO | 2013055711 A3 | 4/2013 |

OTHER PUBLICATIONS

Barros et al., "Diversified Service Provisioning in Global Business Networks", 2011 Annual SRII Global Conference, © 2011 IEEE, pp. 716-728.

(Continued)

*Primary Examiner* — David Garcia Cervetti
(74) *Attorney, Agent, or Firm* — Daniel R. Simek

(57) ABSTRACT

One or more processors receive information regarding a program module that includes a description of a function, license terms, and non-functional properties of the program module. The license terms, the description of function, and the non-functional properties of the program module are identified, based on an analysis of the information. An object of interest of each license term of the license terms is determined, such that the object of interest is directed to a condition influencing license term compliance. Rules corresponding to compliance of the one or more license terms of the program module are determined, and the analyzed information of the program module is stored in a metamodel format organized into categories including the description of function, the one or more license terms, and (Continued)

the non-functional properties of the program module, utilizing standardized syntax and semantics.

19 Claims, 5 Drawing Sheets

(51) Int. Cl.
  *G06F 21/10* (2013.01)
  *G06F 17/30* (2006.01)

(56) References Cited

U.S. PATENT DOCUMENTS

| | | | | |
|---|---|---|---|---|
| 6,189,146 | B1* | 2/2001 | Misra | G06F 21/105 |
| | | | | 705/59 |
| 7,505,940 | B2* | 3/2009 | Vijay | G06Q 90/00 |
| | | | | 705/51 |
| 7,734,550 | B1* | 6/2010 | Bennett | G06F 21/105 |
| | | | | 705/51 |
| 7,752,138 | B1* | 7/2010 | Dean | G06Q 30/06 |
| | | | | 705/50 |
| 7,870,075 | B1* | 1/2011 | Sabet | G06F 21/105 |
| | | | | 380/201 |
| 8,229,858 | B1* | 7/2012 | Mazza | G06F 21/10 |
| | | | | 705/51 |
| 8,321,352 | B1* | 11/2012 | Rameshkumar | G06F 21/12 |
| | | | | 705/51 |
| 8,479,161 | B2* | 7/2013 | Weigert | G06F 11/3604 |
| | | | | 717/124 |
| 8,543,372 | B1* | 9/2013 | Fernandez | G06Q 50/184 |
| | | | | 703/26 |
| 8,589,306 | B1* | 11/2013 | Morriss | G06Q 50/184 |
| | | | | 705/1.1 |
| 8,725,647 | B2* | 5/2014 | Disciascio | G06F 21/10 |
| | | | | 705/59 |
| 8,738,535 | B2* | 5/2014 | Gaetano, Jr. | G06Q 20/00 |
| | | | | 705/59 |
| 8,739,298 | B2* | 5/2014 | Biswas | G06F 21/105 |
| | | | | 726/1 |
| 8,781,970 | B2* | 7/2014 | Boomershine | G06F 21/105 |
| | | | | 705/51 |
| 8,898,657 | B2* | 11/2014 | Demeyer | G06F 21/10 |
| | | | | 717/172 |
| 9,009,079 | B2* | 4/2015 | D'Alo | G06Q 10/02 |
| | | | | 705/59 |
| 9,122,843 | B2* | 9/2015 | Pichetti | G06F 21/10 |
| 9,336,369 | B2* | 5/2016 | Indenbom | G06F 21/128 |
| 9,906,509 | B2* | 2/2018 | Lu | G06F 21/10 |
| 2001/0032094 | A1* | 10/2001 | Ghosh | G06Q 10/06375 |
| | | | | 705/317 |
| 2002/0133383 | A1* | 9/2002 | Chao | G06Q 10/0633 |
| | | | | 705/4 |
| 2002/0138764 | A1* | 9/2002 | Jacobs | G06F 21/10 |
| | | | | 726/28 |
| 2002/0169625 | A1* | 11/2002 | Yang | G06F 21/10 |
| | | | | 705/59 |
| 2003/0125976 | A1* | 7/2003 | Nguyen | G06Q 40/08 |
| | | | | 705/51 |
| 2003/0182146 | A1* | 9/2003 | Watanabe | G06F 21/105 |
| | | | | 705/59 |
| 2004/0039916 | A1* | 2/2004 | Aldis | G06F 21/10 |
| | | | | 713/177 |
| 2004/0143746 | A1* | 7/2004 | Ligeti | G06F 21/10 |
| | | | | 713/185 |
| 2005/0071276 | A1* | 3/2005 | Bruchlos | G06Q 30/00 |
| | | | | 705/51 |
| 2005/0102240 | A1* | 5/2005 | Misra | G06Q 30/06 |
| | | | | 705/59 |
| 2005/0114265 | A1* | 5/2005 | Satkunanathan | G06F 21/10 |
| | | | | 705/59 |
| 2005/0125359 | A1* | 6/2005 | Levin | G06Q 10/10 |
| | | | | 705/59 |
| 2006/0015465 | A1* | 1/2006 | Kume | G06F 21/10 |
| | | | | 705/59 |
| 2006/0106748 | A1* | 5/2006 | Chafle | G06F 9/5061 |
| 2006/0106821 | A1* | 5/2006 | Cox | G06F 21/105 |
| 2006/0116966 | A1* | 6/2006 | Pedersen | G06F 21/10 |
| | | | | 705/59 |
| 2006/0149515 | A1* | 7/2006 | Horton | G21C 7/36 |
| | | | | 703/6 |
| 2006/0242077 | A1* | 10/2006 | Dettinger | G06F 21/12 |
| | | | | 705/59 |
| 2006/0288421 | A1* | 12/2006 | Tsai | G06F 21/10 |
| | | | | 726/26 |
| 2006/0293868 | A1* | 12/2006 | McCall | G06F 11/302 |
| | | | | 702/183 |
| 2007/0006327 | A1* | 1/2007 | Lal | G06F 21/10 |
| | | | | 726/31 |
| 2007/0016532 | A1* | 1/2007 | Zhang | G06F 21/10 |
| | | | | 705/59 |
| 2007/0043675 | A1* | 2/2007 | Birzer | G06F 21/121 |
| | | | | 705/51 |
| 2007/0083762 | A1* | 4/2007 | Martinez | G06F 17/30026 |
| | | | | 713/176 |
| 2007/0219922 | A1* | 9/2007 | Shin | G06F 21/10 |
| | | | | 705/59 |
| 2007/0288386 | A1* | 12/2007 | Adachi | G06F 21/10 |
| | | | | 705/58 |
| 2008/0148253 | A1* | 6/2008 | Badwe | G06F 21/10 |
| | | | | 717/174 |
| 2008/0162308 | A1* | 7/2008 | Sharma | G06Q 10/087 |
| | | | | 705/28 |
| 2008/0209393 | A1* | 8/2008 | Evensen | G06F 8/43 |
| | | | | 717/108 |
| 2008/0215474 | A1* | 9/2008 | Graham | G06Q 10/10 |
| | | | | 705/37 |
| 2009/0031286 | A1* | 1/2009 | Yee | G06Q 10/06 |
| | | | | 717/120 |
| 2009/0037287 | A1* | 2/2009 | Baitalmal | G06F 21/128 |
| | | | | 705/27.1 |
| 2009/0037337 | A1* | 2/2009 | Baitalmal | G06Q 99/00 |
| | | | | 705/59 |
| 2009/0183001 | A1* | 7/2009 | Lu | G06F 21/10 |
| | | | | 713/168 |
| 2009/0198543 | A1* | 8/2009 | Pastorelli | G06F 21/121 |
| | | | | 705/59 |
| 2009/0248428 | A1* | 10/2009 | Disciascio | G06Q 10/00 |
| | | | | 705/306 |
| 2009/0249493 | A1* | 10/2009 | Disciascio | G06F 21/10 |
| | | | | 726/31 |
| 2009/0249494 | A1* | 10/2009 | Disciascio | G06F 21/10 |
| | | | | 726/31 |
| 2009/0259591 | A1* | 10/2009 | Starostin | G06F 21/10 |
| | | | | 705/59 |
| 2010/0153282 | A1* | 6/2010 | Graham | G06Q 10/10 |
| | | | | 705/310 |
| 2010/0185686 | A1* | 7/2010 | Weigert | G06F 21/10 |
| | | | | 707/803 |
| 2010/0250730 | A1* | 9/2010 | Menzies | G06F 21/105 |
| | | | | 709/224 |
| 2010/0251379 | A1* | 9/2010 | Myers | G06F 21/105 |
| | | | | 726/26 |
| 2011/0023123 | A1* | 1/2011 | King | G06F 21/105 |
| | | | | 726/26 |
| 2011/0047540 | A1* | 2/2011 | Williams | G06F 8/61 |
| | | | | 717/178 |
| 2011/0072431 | A1* | 3/2011 | Cable | G06F 9/5077 |
| | | | | 718/1 |
| 2011/0072522 | A1* | 3/2011 | Koka | G06F 21/105 |
| | | | | 726/31 |
| 2011/0131134 | A1* | 6/2011 | Ferris | G06F 21/10 |
| | | | | 705/40 |
| 2011/0131315 | A1* | 6/2011 | Ferris | G06Q 30/0601 |
| | | | | 709/224 |
| 2011/0218928 | A1* | 9/2011 | Refior | G06Q 50/184 |
| | | | | 705/310 |
| 2012/0137138 | A1* | 5/2012 | Gregorovic | G06F 17/30 |
| | | | | 713/189 |

(56) References Cited

U.S. PATENT DOCUMENTS

| | | | | |
|---|---|---|---|---|
| 2012/0255025 A1* | 10/2012 | Roshchin | G06F 21/105 | 726/26 |
| 2012/0311564 A1* | 12/2012 | Khalid | G06F 8/61 | 718/1 |
| 2013/0016470 A1* | 1/2013 | Kacin | G06F 21/105 | 361/679.31 |
| 2013/0019316 A1* | 1/2013 | Kacin | G06F 21/10 | 726/26 |
| 2013/0024388 A1* | 1/2013 | Kolb | G06F 17/2247 | 705/317 |
| 2013/0091543 A1* | 4/2013 | Wade | G06F 21/54 | 726/1 |
| 2013/0104125 A1* | 4/2013 | Sarma | G06F 9/45558 | 718/1 |
| 2013/0110675 A1* | 5/2013 | Bouw | G06Q 30/04 | 705/26.41 |
| 2013/0132584 A1* | 5/2013 | Palladino | H04L 65/40 | 709/226 |
| 2013/0179989 A1* | 7/2013 | Garst, Jr. | G06F 9/468 | 726/27 |
| 2013/0282599 A1* | 10/2013 | Kang | G06Q 10/10 | 705/310 |
| 2013/0282748 A1* | 10/2013 | Liensberger | G06F 9/44526 | 707/766 |
| 2014/0040343 A1* | 2/2014 | Nickolov | G06F 9/4856 | 709/201 |
| 2014/0068560 A1* | 3/2014 | Eksten | G06F 9/5066 | 717/120 |
| 2014/0072177 A1* | 3/2014 | Chou | G06K 9/3258 | 382/105 |
| 2014/0090051 A1* | 3/2014 | Brundridge | G06F 21/14 | 726/17 |
| 2014/0101061 A1* | 4/2014 | Boudreau | G06F 21/10 | 705/317 |
| 2014/0164262 A1* | 6/2014 | Graham | G06Q 10/06 | 705/310 |
| 2014/0278820 A1* | 9/2014 | Dantuma | G06Q 10/0637 | 705/7.37 |
| 2014/0379596 A1* | 12/2014 | Pruss | G06F 21/105 | 705/318 |
| 2014/0380499 A1* | 12/2014 | Pruss | G06F 21/62 | 726/27 |
| 2015/0013015 A1* | 1/2015 | Zheng | G06F 21/105 | 726/27 |
| 2015/0067884 A1* | 3/2015 | Wang | G06F 21/105 | 726/27 |
| 2016/0026635 A1* | 1/2016 | Kunapuli | G06Q 10/0637 | 707/748 |
| 2016/0042159 A1* | 2/2016 | Vijay | G06F 21/10 | 726/29 |

OTHER PUBLICATIONS

Chen et al., "Cloud Licensing Model for .NET Software Protection", The 7th International Conference on Computer Science & Education (ICCSE 2012), Jul. 14-17, 2012, Melbourne, Australia, © 2012 IEEE, pp. 1069-1074.

Kuebel et al., "Business Models of Developer Platforms in the Telecommunications Industry—an Explorative Case Study Analysis", 2014 47th Hawaii International Conference on System Science, © 2014 IEEE, pp. 3919-3928.

Tordsson et al., "Optimized Infrastructure Services", OPTIMIS, Seventh Framework Programme, Submission Date: Mar. 10, 2012, © OPTIMIS Consortium, pp. 1-125.

Weiss, Michael, "TIM Series: Open APIs, Mashups and User Innovation", Technology Innovation Management Review, Jul. 2008, <http://timreview.ca/article/168>.

Zhu et al., "Exposing and Managing Enterprise Services with IBM API Management", IBM, Redbooks, First Edition (Apr. 2014), © Copyright International Business Machines Corporation 2014, pp. 1-266.

List of IBM Patents or Patent Applications Treated as Related, Appendix P, Filed Herewith.

Fuller, et al., U.S. Appl. No. 14/526,852, filed Oct. 29, 2014.

\* cited by examiner

AUTOMATIC GENERATION OF LICENSE TERMS FOR SERVICE APPLICATION MARKETPLACES

BACKGROUND OF THE INVENTION

The present invention relates generally to the field of service licensing, and more particularly to automatically generating licenses for services available through online application marketplaces.

The growth and evolution of representational state transfer (REST) based architecture is influencing online software development. Software providers are publishing access to their REST-based applications, or modules, which provide specific function, and can be integrated into developers' software rather than reproducing code to accomplish the same function. Company-based developers and freelance developers build new applications, which are increasingly based on or include functions provided by existing, published service modules. One example of service modules made available to include in the development of other applications is a marketplace of application programming interfaces (APIs), such as Mashape. (Note: the term "Mashape" may be subject to trademark rights in various jurisdictions throughout the world and are used here only in reference to the products or services properly denominated by the marks to the extent that such trademark rights may exist.)

The service environment that markets APIs includes complex relationships between providers and consumers. Services are often marketed in a static, as-is state, and licensing for services is generally limited to an agreement of time-based availability for a fee. Users that consume multiple APIs are faced with a complex task of evaluating dependencies and constraints of individual API licenses to cover the licensing requirements of their own offerings.

SUMMARY

According to one embodiment of the present invention, a method, computer program product, and system for storing information regarding a program module available to include in development of an application. One or more processors receive information regarding a program modules, the information of the program module includes a description of a function, one or more license terms, and non-functional properties of the program module. One or more processors identify the license terms, the description of function, and the non-functional properties of the instance of the one or more program modules, based on an analysis of the information of the program module. One or more processors determine an object of interest of each license term of the one or more license terms, wherein the object of interest is directed to a condition influencing whether a license term of the program module is met. One or more processors determine rules corresponding to compliance of the one or more license terms of the program module, and one or more processors store in a repository, the information of the program module that is analyzed into a meta-model format organized into categories including the description of function, the one or more license terms, and the non-functional properties of the program module, utilizing standardized syntax and semantics.

DETAILED DESCRIPTION

Figure 1:
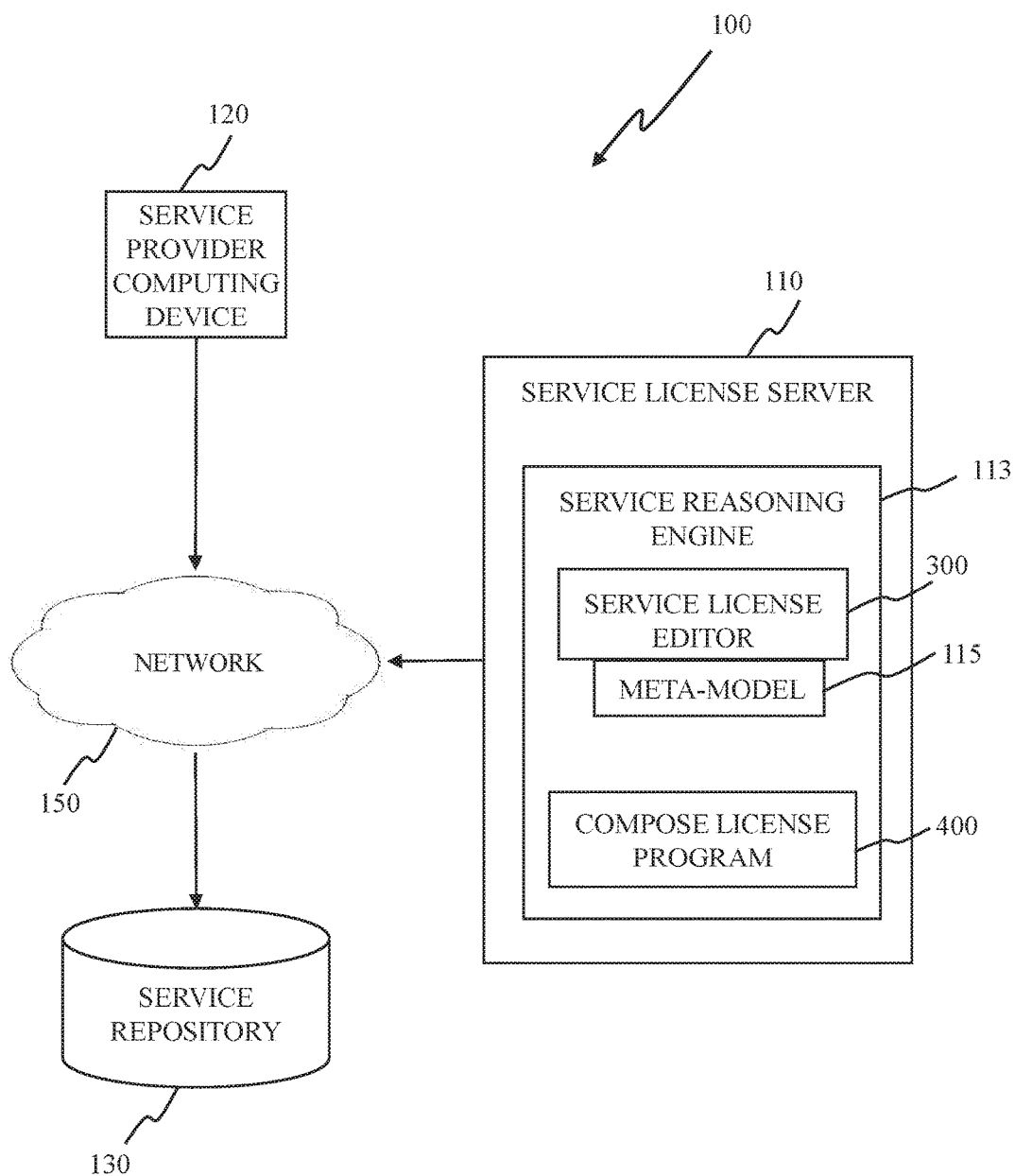
FIG. 1 is a functional block diagram illustrating a distributed service license processing environment, in accordance with an embodiment of the present invention.

Embodiments of the present invention recognize that making programming modules available online enables enterprise developers and freelancers to integrate the services offered by the published modules into other applications being developed. Embodiments also recognize that service licensing may include complex attributes that are not met by current service level agreements. Complex relationships and conflicting business constraints exist and continue to grow between consumers and providers of service modules. Service licensing can span capacity-based and usage-based models, and often include a combination of both. Management of licensing is demanding and tedious, and tends to be manual in practice, due to human-readable language used in licensing agreements.

Software licensing is static, data-centric, and primarily capacity-based models, defining the number of instances of use, the number of CPUs that can access the software, or the memory limit associated with the software use. Service licenses extend traditional software licenses by adding usage-based models that require event driven calculations. Web service level agreements enable description of service levels for web services; however, the agreements are static approaches and cannot capture business or other constraints.

The reference to service modules includes programming code and instructions that provide one or more functions, and that may be included within an application in lieu of repetitiously developing the same function in the code of the application being developed. Embodiments of the present invention recognize that one example of accessing service modules is the use of published application programming interfaces (APIs) in an API marketplace. An API specifies a software component in terms of its operations, inputs and outputs, and underlying types. Its main purpose is to define a set of functionalities that are independent of their respective implementation, and allow integration of function or features into an application. Along with providing a particular functionality or feature, published service APIs include license terms. Hereafter, discussion of embodiments of the present invention will reference APIs for clarity and exemplary purposes, however, embodiments are not limited to specific types or instances of software modules that are accessible and available for integrating into other applications being developed.

Embodiments of the present invention provide a method, system and computer program product for automatically composing licenses for online applications that utilize published service APIs, based on the use of a meta-model used to structure service license terms of the published APIs. In some embodiments of the present invention, a service provided by a published API and the license terms of the API, are defined in a format that includes a standardized syntax and semantics. Non-functional properties of the service license includes business constraints, license metric calculation, quality of service calculation, and pricing rules. The meta-model enables representation of license terms of a single service API or a pattern of license terms from a composite of multiple published service APIs, used in the application as an alternative to recreating code for the function provided by the service API. Some embodiments represent the format of the service description and licensing terms as an XML schema, and can be read by, analyzed and indexed by a computing device system.

In some embodiments of the present invention the service API information and the associated licensing terms for published services are stored in a repository, to be searched based on queries received from application service providers. A service reasoning engine searches the service repository based on a service application provider's query, for API services having licensing terms matching the query criteria. The service reasoning engine can use the standardized syntax and semantics of the service API licensing terms to compare license terms of a set of selected service APIs and resolved license term conflicts, based on applying rules. The reasoning engine composes a service license for an application received by the reasoning engine, which includes one or more published service APIs. In composing a license for a new online application, embodiments of the present invention consider license terms of dependent service APIs used by the new online application in composing the licensing terms for the new online application. The composed license for the set of APIs used in the received application captures business and legal constraints, quality of service calculations and rules, defines metrics used for service measurements, and includes pricing rules and calculations. These attributes are included in the meta-model template data extracted from published service APIs received and stored in a service repository, accessible to the service reasoning engine.

The present invention will now be described in detail with reference to the Figures. FIG. 1 is a functional block diagram illustrating a distributed service license processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

FIG. 1 is a functional block diagram illustrating distributed service license processing environment 100, in accordance with an embodiment of the present invention. Service license processing environment 100 includes service provider computing device 120, service repository 130, service license server 110, which includes service licenses editor 300 that uses license meta-model 115, and service license server 110 also includes service reasoning engine 113, and license composing program 400, all interconnected through network 150.

Network 150 can be, for example, a local area network (LAN), a telecommunications network, a wide area network (WAN), such as the Internet, a virtual local area network (VLAN), or any combination that can include wired, wireless, or optical connections. In general, network 150 can be any combination of connections and protocols that will support communications between service provider computing device 120, service repository 130, service license server 110, and the operation of service license editor 300 and license composing program 400 within service reasoning engine 113, in accordance with embodiments of the present invention.

Service provider computing device 120 is a source of service APIs to be published and accessible via the Internet. Service provider computing device 120 may represent an enterprise organization developing service applications that perform particular service functions and can be accessed through APIs. Service provider computing device 120 may also represent a freelance developer of Internet-based service APIs. In some embodiments of the present invention, the APIs are published on an Internet-based API marketplace and have licensing terms associated with the use of each service API. Service provider computing device 120 may also represent an application developer (enterprise or freelance) that includes one or more published APIs as part of an application being developed.

Service repository 130 is a storage repository that includes licensing terms and information associated with published APIs of service applications. In particular, service repository 130 stores information of service license properties that conforms to meta-model 115 attributes and format. Service APIs submitted by service provider computing device 120 are analyzed by service reasoning engine 113, and the terms of the license are determined and formatted consistent with meta-model 115, forming an association of the function of a service API and the non-functional licensing terms associated with the service. Service repository 130 may be searched to identify a service API to be included in the development of a service application.

Server license server 110 is a computing device that includes service reasoning engine 113, which operates service license editor 300 and compose license program 400, both of which utilizes meta-model 115, in accordance to an embodiment of the present invention. Service license server 110 may be a desk top computing device, a rack mounted computing device, a blade server, a management server, a mobile computing device, or any other electronic device or computing system capable of performing program instructions, and receiving and sending data. In other embodiments, server 110 may represent a computing system utilizing multiple computers as a server system, such as in a cloud computing environment. In yet other embodiments, service license server 110 can be a laptop computer, a tablet computer, a netbook computer, a personal computer (PC), a desktop computer, a personal digital assistant (PDA), a smart phone, or any programmable electronic device capable of communicating with service repository 130 and service provider computing device 120 via network 150. In another embodiment, service license server 110 can be a computing system utilizing clustered computers and components (e.g., database server computer, application server computers, etc.) that act as a single pool of seamless resources when accessed within distributed transaction processing environment 100. Service license server 110 may include internal and external hardware components, as depicted and described with reference to FIG. 5.

Meta-model 115 is model structure of non-functional license term information for service APIs. Meta-model 115 includes a structured format, represented in an extensible markup language (XML) schema, in which information of service API license terms is populated to be used for API search and composing application licenses that include the use of published APIs. In some embodiment of the present invention, the information of service API license terms of meta-model 115 are included in a template that is generated by service reasoning engine 113, operating service license editor 300, and stored in service repository 130. In other embodiments, service provider computing device 120 includes the license term information of a service API submitted for publishing, in a meta-model 115 formatted template, along with the service API.

In some embodiments of the present invention, the meta-model uses standardized syntax and semantics for service license descriptions, and represents the information associated with a service API license as an XML schema. Use of an XML schema to represent the service license information enables computing systems to recognize, understand, and work with the license information. In some embodiments, meta-model 115 includes one or more service API license categories of: business constraints, metric calculation rules, quality of service (QoS) calculation rules, and price calculation logic and rules. In some embodiments, meta-model business constraints include, but are not limited to, conditions of: membership, privacy, location, brand permission, support provided, and time-related conditions of use.

Service reasoning engine 113 is an application depicted as operating on service licenses server 110, and including service license editor 300 and compose license program 400. In one embodiment of the present invention, service reasoning engine 113 receives service API information regarding functional and non-functional license properties, and by the operation of service license editor 300, analyzes, extracts, and stores the service API related information in service repository 130, using a template format of meta-model 115. In another embodiment, service reasoning engine 113 receives queries for service APIs having particular functional and non-functional licensing properties. By the operation of compose license program, service reasoning engine 113 performs searches for service APIs matching the properties of the query, and the terms and properties of the licenses may be used to compose an overall service license for an application utilizing the service APIs included in the query.

Service license editor 300 is depicted as a program module of service reasoning engine 113. In other embodiments of the present invention, service license editor 300 may be a stand-alone program accessible to service license server 110. In other embodiments service license editor 300 may be integrated into a large application that manages service APIs and service license terms and properties.

Service license editor 300 receives service API information including functional properties of the service API and functional and non-functional properties of the service API license terms. Service license editor 300 analyzes the license terms and properties of the service API and stores the information in a repository, such as service repository 130, in a format consistent with meta-model 115. The stored information includes attributes of the service API, such as, but not limited to, name or label, description, data type, service type, scope of function, category type, and version. In one embodiment of the present invention, a stored service license type includes information consistent with meta-model 115 format, and one or a combination of the properties: business constraints, metric rules, quality of service rules, and price rules. In other embodiments, the properties include at least one of: calculations, conditions, functions, and variables.

By extracting, organizing, and storing the service API license information to align with a meta-model, such as meta-model 115, service APIs with particular licensing properties can be searched for in service repositories, and the meta-model formatted information can be used to compose licensing terms for applications that make use of publishes service APIs.

Compose license program 400 is depicted as a program module of service reasoning engine 113. In other embodiments of the present invention, compose license program 400 is a stand-alone program accessible to service license server 110. In yet other embodiments service license editor 300 is an integrated part of a large application that manages service APIs and service license terms and properties.

Compose license program 400 receives queries for service APIs and searches a service repository, such as service repository 130, to determine a match between the function and license terms of the APIs of the service repository and those of the query. Having determined matches, compose license program 400 composes a license for a service application that includes the matched service API licenses. The composed license is a composite of license term and property rules that includes the published service APIs used by the application and the application being developed. Compose license program 400 identifies the term and property rules of each license (including terms associated with the developed application, also input in a meta-model XML schema format), compares license features and properties, determines the over-riding features and properties for the composite license, composes the composite license, and identifies any exceptions which require expert skill intervention to resolve. Exceptions include meta-model license information that is not understood by the system.

The composed license may require resolving terms associated with each of multiple service API licenses that differ. In one embodiment of the present invention, compose license program 400 resolves the rule interaction between multiple meta-model properties that are defined by condition operators. For example, to determine the merge of license terms an "or" operator is applied, or to determine the intersection of terms, an "and" operator is applied. In other situations, conditional operators may be applied to incur a particular license term based on a particular condition, and other logic operators may be used to correspond to the resolution of license terms. In other embodiments, a machine learning approach may be used to compare and resolve multiple license terms that differ to automatically compose a composite license for an application in which one or more published service APIs are included. Semantic models using supervised learning techniques distinguish term terminology and resolved determined conflicts by applying appropriate operators and logic rules to enable over-riding license terms, disable subordinate license terms, or may blend attributes of conflicting license terms.

Figure 2:
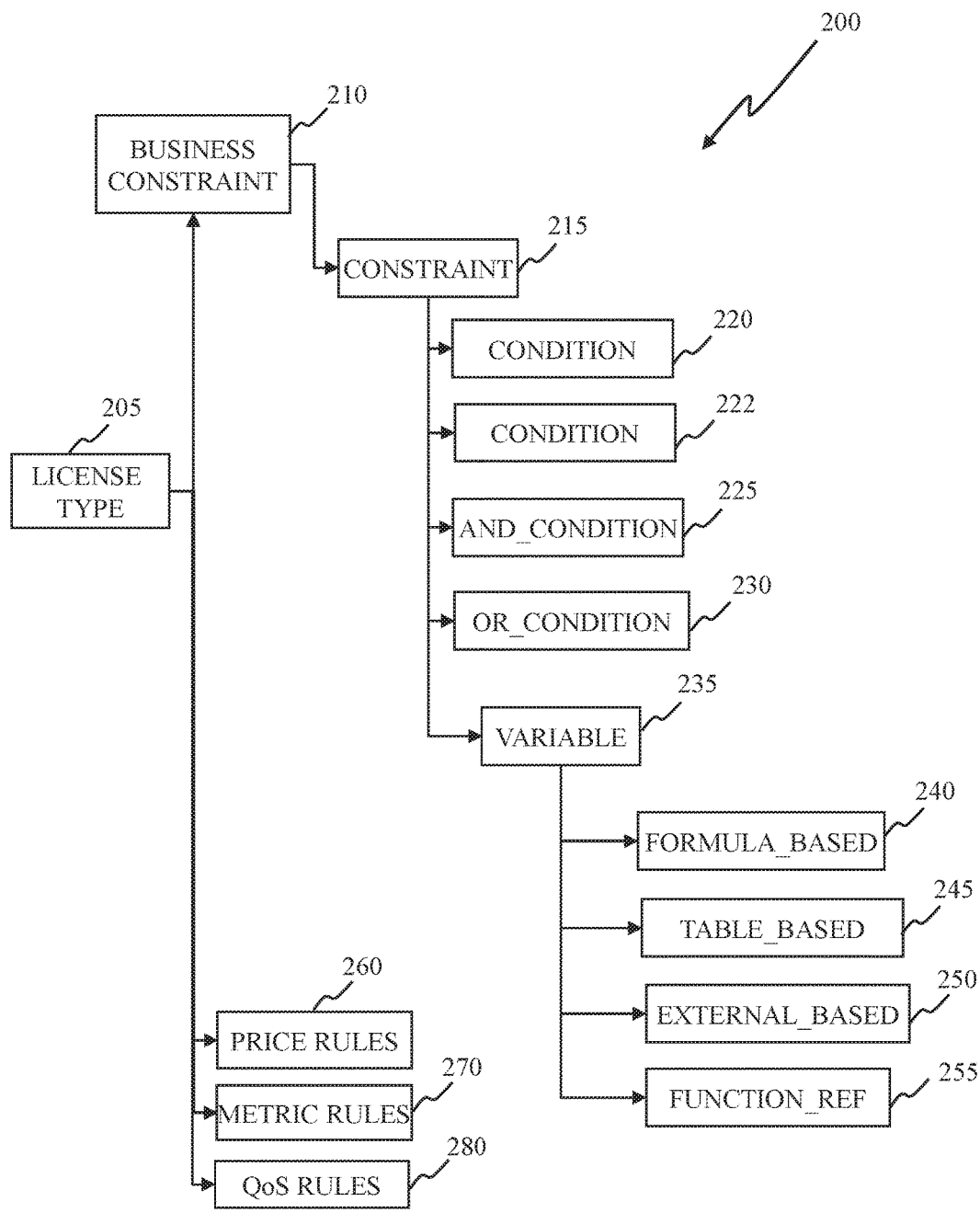
FIG. 2 is a functional block diagram depicting operational components of automated service licensing, operating on a server computer within the distributed service license processing environment of FIG. 1, in accordance with an embodiment of the present invention.

FIG. 2 is a functional block diagram depicting meta-model category example 200 of license term properties of a service API, within the distributed service license processing environment of FIG. 1. Category example 200 includes license type 205, which, in one embodiment, includes a label and description of the type of license, which in this case is a service API, or may be further defined as a particular type of service API. License type 205 includes license categories business constraint 210, price rule 260, metric rule 270, and QoS rule 280. For example purposes and clarity, FIG. 2 includes one possible structure of a meta-model for a business constraint category of a service license. The meta-model depicted includes additional license term categories, but without their details.

Business constraints 210 includes constraint 215, representing a particular constraint of the license terms. For example the constraint may limit access to the service API based on the location corresponding to an IP address, or in another case, the service API may require a user to obtain a subscription to use the service API. Although a single constraint, constraint 215, is depicted, there may be any number of constraints included in business constraints 210.

In some embodiments of the present invention, for each constraint, there are one or more conditions. Constraint 215 includes condition 220 and condition 222. The condition applies to a specific constraint and further defines the license term associated with the constraint. For example, condition 220 requires the access to the service API to be from an IP address corresponding to a location in the United States; and in another example, condition 222 further defines a constraint requiring a subscription to be a premium subscription for access to the API during defined peak usage windows.

Constraint 215 includes operators which, in one embodiment, are used to apply rules to the conditions of constraints. And_condition 225 is an operator that may be used to determine an intersection of one or more constraint conditions. Or_condition 230 is an operator that may be used to determine a union of one or more constraint conditions. Other logic operators may be applied as necessary to represent interaction of various constraint conditions, and to resolve conflicts between terms licenses of multiple APIs used within an application being developed. In other embodiments, a machine learning method may be used to resolve interactions of constraint conditions by determining over-riding license terms and applying operators as rules to resolve the interactions or conflicts of the license terms. Supervised learning may be used with a learning model to develop an automated technique of resolving interacting service license terms, such as multiple business constraint conditions. In yet other embodiments, user intervention is used to resolve interaction of multiple business constraint conditions, and may serve as supervised learning towards future automated condition resolution by machine learning.

Constraint 215 includes variable 235 which is an object of the business constraint that may be used to identify the constraint, conditions of the constraint and used in conjunction with operators. Variable 235 may be determined by formulat_based 240, which may involve a calculation or algorithm. Variable 235 may be identified by locating the object of the business constraint from a table, by using table_based 245. Variable 235 may require determination from some external source, by using external_based 250, or the label or value of variable 235 may rely on a reference to another function, in which case variable 235 may depend on function_ref 255.

In embodiments of the present invention, other service license categories of meta-model 115 include metric calculation rules (metric rules 270), QoS calculation rules (QoS rules 280), and price calculation rules (price rules 260). Metric calculation rules of a service license apply to how the consumption of the service is measured. The metric calculation rules includes one or more metric units, each of which is used to determine a portion of service usage. For example, metric units may include usage and capacity based units. Metric units for usage may count number of invocations of an API, cumulative time of API access, or a combination, for example. The usage calculation may be based on patterns of events, correlation of one or more conditions, and may include particular update actions. Metric units for capacity may include a formula function determining the number of CPUs that have access to the API, or limitations on storage. The capacity property may be accessed from a table, external function, or reference function. The metric calculation rules category may also include run-time constraints, such as higher usage rates during known peak usage time slots.

Quality of service (QoS) rules 280 is a meta-model category for a service API license that includes attributes of the service API and measurements related to the function and performance of the API, as stated by the provider. The attributes for the QoS category of the service API license may include: name, description, data type, QoS type, scope, and classification. The measurements of the QoS category are often based on a promised level of availability of the service API, or a level of performance. Measurements calculations use metric values that may be formula based and calculated, looked-up from table-based or file-based data, obtained from external sources, or may utilize references in combination with other measurement activity to derive QoS metrics.

Price rules 260 is a meta-model category for a service API license and includes attributes defining the calculation logic of service cost. Price rules 260 includes conditions to which pricing rules apply, and are based on unit price for each metric unit determined as applicable. Conditions for price rules 260 may include QoS calculations for situations in which the QoS is below the guaranteed level, a reduction in charges to the consumer may be applied. Price rules 260 may include time-based conditions, such as the amount of cumulative time a consumer of service has accessed an API. Usage conditions may include a number of invocations of an API, or may include a free-usage period for the first 100 invocations. Price rule 260 may also include a capacity-based condition, which may depend upon the number of different user IDs or the number of different CPUs that access the API. Price rules 260 includes cost calculation functions that make use of metric units, unit price, and unit calculations to determine a consumer's cost.

Figure 3:
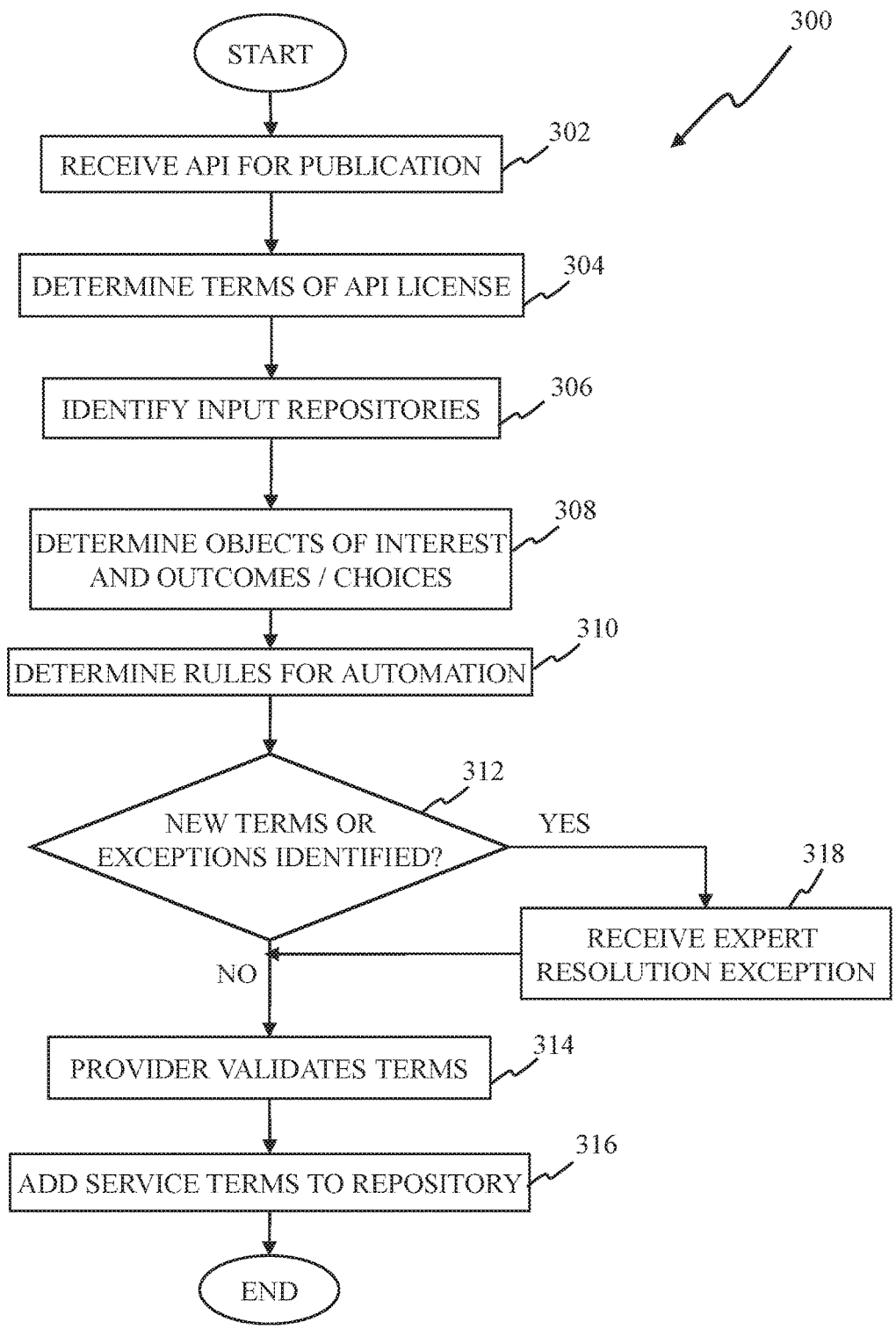
FIG. 3 illustrates operational steps of a license term program, operating on a service license server within the distributed service licensing environment of FIG. 1, in accordance with an embodiment of the present invention.

FIG. 3 illustrates operational steps of service license editor 300, operated by service reasoning engine 113, hosted on service license server 110, within distributed service licensing environment 100 of FIG. 1, in accordance with an embodiment of the present invention. Service license editor receives an API for publication (step 302). A service provider submits a service API, including licensing information that includes terms and properties of the license, to be published. In one embodiment of the present invention, publishing of an API includes presenting information describing the function and attributes of the service API and the information associated with licensing the API, within an API marketplace. A service API marketplace includes multiple APIs that may be searched for, or browsed online, within the marketplace. In other embodiments, the service API may be published individually by posting information associated with the service API on a web page owned by the service API author, or within an advertisement included on a web page, for example. Service license editor 300 receives the information associated with the API, and the licensing terms and properties of the API.

Service license editor 300 determines the terms and properties of the API license (step 304). Service license editor 300 analyzes the received information and identifies the license terms and determines conditions properties and calculations associated with the license. In one embodiment of the present invention, service license editor 300 may reference tables or a library of known license terminology and phrases to recognize terms. In other embodiments, service license editor 300 may use semantic analysis and natural language processes to determine license terms of the service API.

In some embodiments of the present invention, service license editor 300 receives the service API license information in a meta-model format, directly from a service API provider. In this case the provider may complete information templates formatted to include the meta-model information to enable and facilitate search and automatic composition of API licenses. In other embodiments of the present invention, the API license information is received in a format different from a meta-model format, and service license editor 300 uses techniques, such as semantic analysis, natural language processing, or keyword/key phrase lookup libraries, for example, to determine the meta-model information within the service API license content, and stores the information associated with the API in a service repository, such as service repository 130.

Having determined the terms of the service API license, service license editor 300 identifies the input repositories (step 306). Input repositories are systems or devices that store service implementation details, such as a code repository. In other embodiments, an input repository may be a ticketing engine that is used to track and document the development of services and service APIs. Identifying the location of service implementation details, such as access to the service application code, enables the search and automatic determination of license term implementation and enforcement. Implementation details may include how the application determines code access, usage, hosting details (if appropriate), security, support, and other information used to determine conditions and properties of a license term.

Having determining the input repository associated with a license term, service license editor 300 determines objects of interest (step 308). An object of interest refers to the item to which the license term refers to, or by which the term is influenced. Service license editor 300 determines the object of interest for each term identified in the license. For example, a license term of "subscription required" is identified for a particular service API license. The input repository for this term is the application code, which when analyzed indicates that a user account is used by the application, supporting the need for a subscription of some type. In another example, in which a license term of "privacy" is determined by service license editor 300, the input repository is determined to be the API code along with the hosting details. The objects of interest are the type of data used and stored by the code, and the hosting details of where the data is stored. The type of data may be personal finances and the data may be hosted on a third party server. The third party server hosting terms are an additional object of interest, and in this example, include retaining a backup copy of all data.

Service license editor 300 determines the outcomes and choices associated with each license term by using the determined object of interest and searching the respective input repository for elements that define, support or enable the license term. In some embodiments of the present invention, this involves recognizing elements of the service API code associated with the object of interest for the license term. The outcomes and choices are the cumulative attributes of multiple license terms from multiple service APIs included in an application. The outcomes and choices may overlap or conflict for a given type of license term and are resolved by service license editor 300 applying rules of automation.

Having determined objects of interest, service license editor 300 determines the rules for automation of composing licenses (310). Service license editor 300 includes rules that are applied to the outcomes and choices of licensing terms of multiple service APIs integrated into a developed application. The rules analyze the licensing term choices and determine if a particular license term is more stringent than others, or if there are conditions applicable to a license term of a particular API and applies rules that establish priority of terms or term conditions such that a license for the developed application may be automatically generated based on the meta-model data and applying the rules of priority to resolve overlap or conflict of license terms. For example, an application being developed includes two service APIs that include data security/privacy terms. One of the service API licenses includes terms of hosting data on a third party server, and that the provider retains a copy of data, but is not liable for data loss. The other service API license also hosts data on a third party sever, but that provider's license terms are to make a "best effort" to recover data. The automation rule chooses the "best effort" term for the developed application license, since this license term offers less security support. In another example, for a case in which one API has license terms more restrictive than others that are included in an application being developed, the more restrictive terms are selected by automation rules, to insure those license terms are met. In some embodiments of the present invention, license automation rules may be defined and available in a lookup table or file. In other embodiments, the license automation rules may be derived by machine learning techniques.

Service license editor checks to determine if there are new terms or exceptions (decision step 312). In analyzing service API license terms and properties, and storing API information in meta-model format, service license editor 300 may encounter a new licensing term or identify exceptions in which the term, property, or condition is not recognized. In addition, service license editor 300 may determine that there are no applicable automation rules for a license term encountered.

Determining that no new terms or exceptions have been encountered (312, "NO" branch) service license editor 300 queries the service API provider to validate the license terms (step 314, "NO" branch). The information associated with the service API and the API license, has been extracted and included in a meta-model format that represents the terms and properties of the API license. In one embodiment of the present invention, service license editor 300 queries the review and validation of the structured information by the provider submitting the service API. In another embodiment, service license editor 300 queries the provider to only review and validate exceptions or new license terms. In yet other embodiments, the provider may add information regarding new license terms and constraint conditions that are consistent with the meta-model format. The additional license terms and conditions may be associated with portions of the application being developed other than the published service APIs that have been included in the application.

Receiving validation of terms and exceptions from the provider, service license editor 300 adds the validated terms to the service repository (step 316), and ends. Service license editor 300 receives validation input from the provider of the service API, and stores the API license information in a storage repository, such as service repository 130. The information stored using the XML schema, meta-model structure format, may be searched and used to compose composite licenses for applications being developed that integrate service APIs whose information is stored in the service repository.

In the case in which service license editor 300 determines that there are new terms or exceptions (step 312, "YES" branch), service license editor 300 queries and receives expert resolution of exceptions and new terms (step 318). The expert resolution includes intervention by a knowledgeable user that is able to understand the exception and provide input that results in inclusion of the term or condition in the meta-model data format. In one embodiment, the expert may be the API provider, in another embodiment the expert may be a third party consulted in the area of the service and particular API license terms. Service license editor 300 notes the exception and acts on the exception upon receipt of input from the expert. In some embodiments, the expert may determine the exception to be excluded from the service repository.

Having received input of expert resolution of exceptions, service license editor 300 queries the API provider to validate the terms (step 314), and service license editor 300 proceeds as described above.

Figure 4:
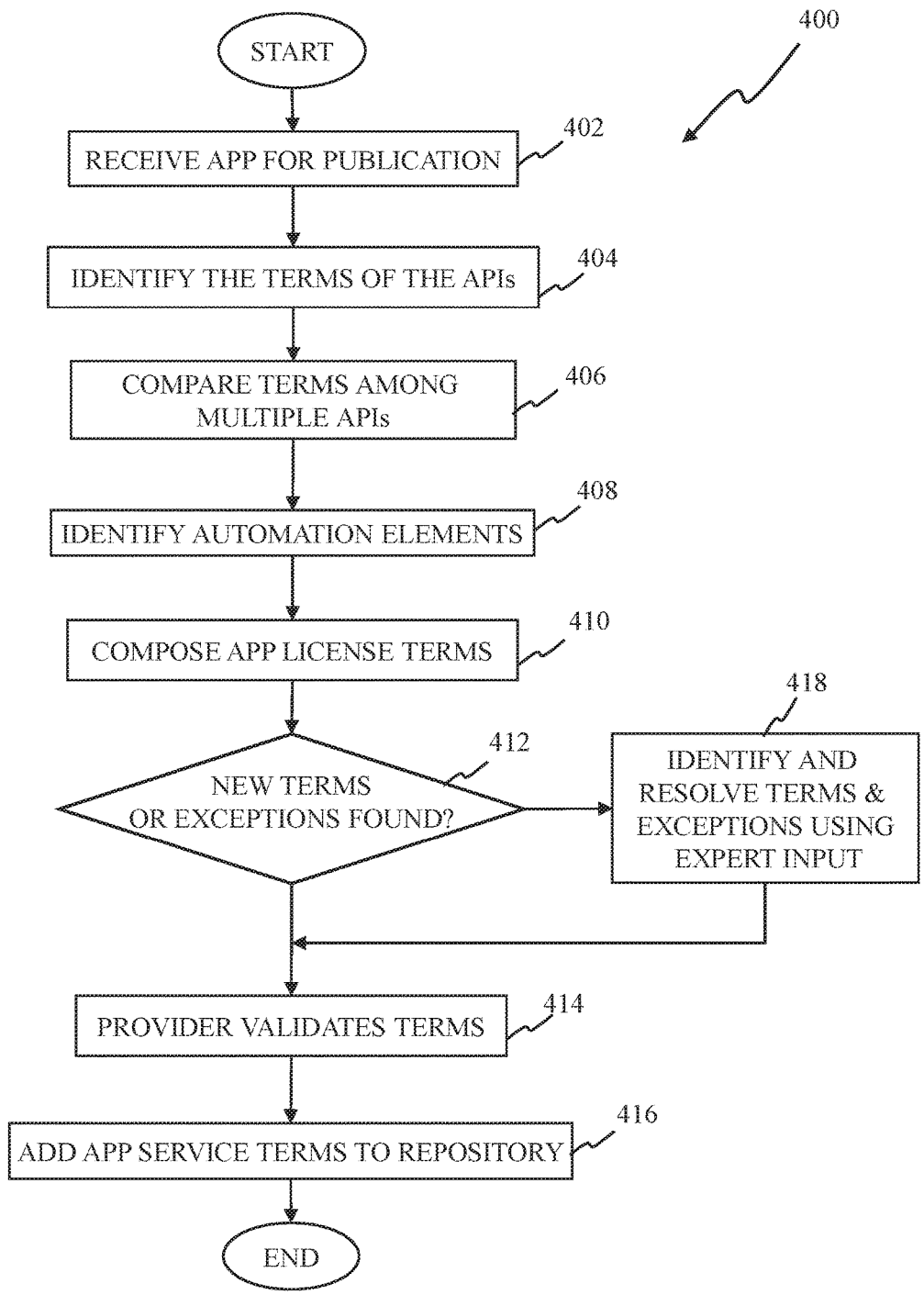
FIG. 4 illustrates operational steps of a license composing program, operating on a service licensing server within the distributed service licensing environment of FIG. 1, in accordance with an embodiment of the present invention.

FIG. 4 illustrates operational steps of license composing program 400, operating on service license server 110, within distributed service licensing environment 100 of FIG. 1, in accordance with an embodiment of the present invention. Service license editor 300 performs tasks associated with receiving service license APIs and information regarding the conditions and terms of licensing the APIs. Alternatively, there are cases in which applications that include published APIs require determination of terms and conditions that cover the integrated published APIs, as well as any other attributes of the received application.

License composing program 400 receives an application for publication (step 402). The received application includes APIs integrated within the developed code of the application, and each of the APIs includes terms and conditions associated with the licensed use of the API. The license terms are sometimes referred to as terms of service (ToS). A term of service refers to a particular term of a license and describes the particular constraint, condition, or rule that must be met to use the service, or that the provider agrees to deliver for use of the service. For example, a ToS may limit use within a particular geography, or may limit the number of API invocations per unit of time or in total. Similarly a ToS may include providing the availability of the API for at least 95% of the time for each month.

For example, an application that determines a user's current distance from the nearest gas station uses a published global positioning system (GPS) API to determine the user's current location, and uses a gas station mapping API that lists the GPS coordinates of known gas station locations, and overlays road map data. The application calculates the distances between the nearest ten gas stations within a radius of the user, based on the road map data distances. Both APIs include licensing terms or ToS that define the features and conditions associated with usage of the API.

License composing program 400 identifies the terms of the APIs of the application (step 404). The APIs used within the application are searched for in the service repository of API licensing information that has been stored using the meta-modeling format. License composing program 400 uses the meta-modeling format to determine the terms for each API used within the received application. In one embodiment of the present invention, the API licensing information, stored using the meta-model format, includes license term categories of business constraints, metric rules and calculations, quality of service rules and calculations, and pricing rules and calculations. In other embodiments, the meta-model format may include one of the license term categories, or a combination of the license term categories. In yet other embodiments, additional license term categories may be included with one or more terms from the categories of: business constraints, metric rules and calculations, quality of service rules and calculations, and pricing rules and calculations.

Having identified the license terms of the service APIs of the application, license composing program 400 compares license terms among multiple APIs (step 406). The application may include multiple APIs having similar licensing term categories. License composing program 400 compares the terms of the multiple APIs included within the application. For example, one API may have terms that limits access to users within the United States. Another API may limit access to users within specified states within the Eastern portion of the United States. The license terms are compared to determine the category of each term, as well as the limitations and conditions associated with constraints, metrics, quality of service agreements, and pricing rules. In the example, one term describing the limits of use for the APIs includes specific geographical boundaries describing the limits of the API use.

Having compared the license terms, license composing program 400 identifies automation elements (step 408). A particular object of interest for a license term is an item to which the license term refers to and license composing program 400 determines elements of the API that can be used to automatically determine the features or conditions of the license term. For example, if a license includes a "subscription" or "membership" term, the object of interest for this feature may be an account number, or a membership identification associated with the user of the API. The automation elements that determine the term are identifying the use of an account number, or in another case, the membership ID, within the code of the API. Detecting the use of an account number or membership ID within the API code, license composing program 400 includes the term and sets the condition of "subscription" (or membership) to yes.

License composing program 400 composes the application API terms for the received application (step 410). The differences that exist between terms, which are of the same term category but are associated with different API licenses, are determined during term comparison. License composing program 400 determines the more stringent or more significant constraint associated with the term of the multiple APIs used by the received application. License composing program 400 selects the more limiting condition constraint of the published APIs to over-ride the same or similar licensing term of the other APIs. In this manner all licensing features for a particular term will be met in the received application which was received by license composing program 400. License composing program 400 searches the service repository to identify the terms and conditions associated with the licensing terms of each API included in the received application, and selects an over-riding licensing term covering all APIs of the application, for a particular term.

Having identified the automation elements, license composing program 400 determines if new terms or exceptions are found (decision step 412). As license composing program 400 identifies, compares, and composes terms and conditions of API licenses that are included in the received application, new terms or exceptions to stored licensing terms and conditions, may be encountered. License composing program 400, having determined that new terms or exceptions have been found (step 412, "YES" branch), identifies and resolves exceptions using expert input (step 418). New licensing terms or exceptions to terms, constraints, and/or conditions are identified by license composing program 400, by the failure to match the term or exception from existing service repository entries. The identified new terms and exceptions are resolved by expert input. In some embodiments of the present invention, the new terms and exceptions are reviewed by an external user, who resolves the information associated with the terms and exceptions and provides the information as input in meta-model format. In other embodiments, a semantic analysis may be performed on the new terms and/or exceptions, and include a learning model that determines the information associated with the terms and exceptions and provides meta-model formatted information to be stored in service repository, such as service repository 130. In yet other embodiments, natural language processing and semantic model techniques may be used to interpret and determine the meaning of the new terms and exceptions; and the service license information associated with the new terms and exceptions may be generated by the machine learning model, based on the natural language processing techniques.

If no new terms or exceptions are found (step 412, "NO" branch), license composing program 400 presents the composed license that includes terms and conditions covering the APIs included in the received application to the application provider, and the provider validates the terms (step 414). The license terms for the received application are composed based on license composing program 400 matching identifying license terms of the published APIs to the stored license term information in service repository 130, for example. In composing the licensing terms for the received application, license composing program 400 makes use of rules associated with terms and conditions. In some embodiments of the present invention, license composing program 400 uses logical operators to reflect the appropriate resolution of conflicting or overlapping license terms. For example an "and" logic operator may be use to represent an intersection of term content, whereas an "or" operator may be used to represent a union of term content. By applying rules by logical operations, the mandatory, optional, conditional, and exclusionary aspects of license terms are represented, as well as the determination of an over-ride hierarchy of license term conditions when considering multiple API included within an application.

The composed license terms, with rules applied, are presented to the provider to review and validate the composed license as appropriately representing the license terms of the application and all the published APIs included in the application. In some embodiments, the provider indicates an approval of individual license terms, with an opportunity to edit each term. In other embodiments, the provider gives an overall approval, and has the opportunity to edit the composed license terms, prior to approval. In yet other embodiments, the provider may add new license terms and constraint conditions, consistent with the meta-model format. The additional license terms and conditions may be associated with portions of the application being developed other than the published service APIs that have been included in the application.

Having completed validation of the license terms for the received application, license composing program 400 stores the new terms and exceptions that are associated with the received application in the service repository (step 416), and ends. The new license terms and exceptions, which were encountered by license composing program 400, and not found by searches of service repository 130 (FIG. 1), are added to service repository 130. The new terms and exceptions have been reviewed and resolved by input from user with expert knowledge of the license term and are stored in service repository 130 using a meta-model format, making them searchable and available for future license composing.

Figure 5:
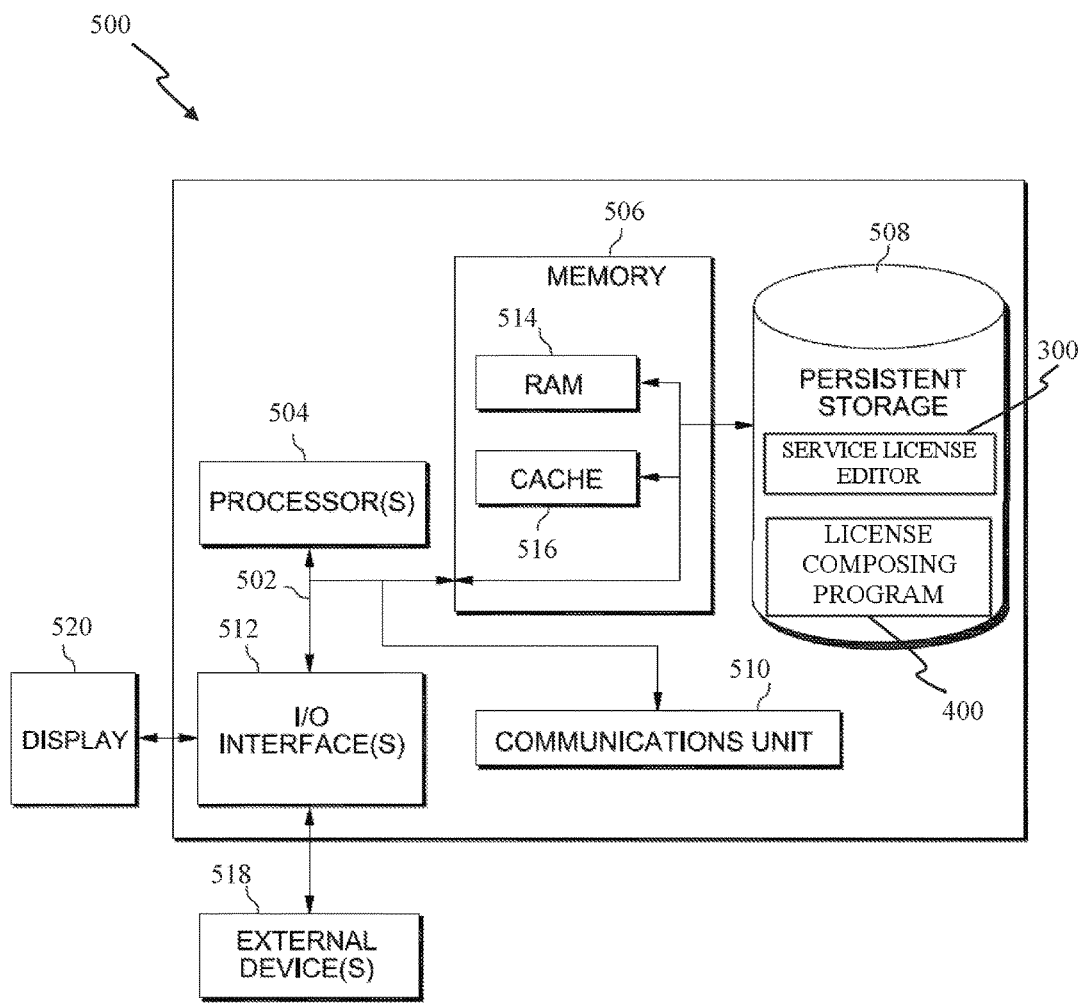
FIG. 5 depicts a block diagram of components of a computing system capable of executing the service license editor and license composing program, operating in the distributed service license processing environment of FIG. 1, in accordance with an embodiment of the present invention.

FIG. 5 depicts a block diagram of components of computing system 500 capable of executing service license editor 300 and license composing program 400, within the distributed service license processing environment of FIG. 1, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Computing system 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Service license editor 300 and license composing program 400 are stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of distributed communication processing environment 100. In these examples, communications unit 510 includes one or more network interface cards. Communications unit 510 may provide communications through the use of either or both physical and wireless communications links. Service license editor 300 and license composing program 400 may be downloaded to persistent storage 508 through communications unit 510.

I/O interface(s) 512 allows for input and output of data with other devices that may be connected to network 150, such as service provider computing device 120 and service repository 130. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., service license editor 300 and license composing program 400, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for generating a standardized structure containing information regarding a program module available as a service for an online application, the method comprising:
receiving, by one or more processors, information regarding the program module available as a service, the information of the program module includes a description of a function of the service, one or more license terms, and non-functional properties of the program module;
determining, by one or more processors, the one or more license terms, the description of the function, and the non-functional properties of the program module, based on an analysis of the information of the program module, wherein the analysis includes a semantic analysis and natural language processing of digitized text included in the information of the program module;
determining an object of interest, by one or more processors, of each license term of the one or more license terms, wherein the object of interest refers to a condition influencing whether a license term of the program module is met;
identifying, by one or more processors, an outcome of each license term of the one or more license terms, based on the object of interest and conditions associated with the online application into which the service of the program module is included;
responsive to determining conflict between license terms of the one or more license terms of the program module, applying, by one or more processors, rules corresponding to compliance of each license term of the one or more license terms of the program module;
generating, by one or more processors, a meta-model structure for the program module based on a meta-model template that includes the information regarding the program module that is extracted and formatted, wherein the generation of the meta-model structure transforms the one or more license terms of the program module into a standardized syntax and semantic format, and includes a description of the function of the service provided by the program module, and non-functional properties of the one or more license terms of the service, represented in an XML schema; and
storing in a repository, by one or more processors, the information of the program module as a meta-model structure using the standardized syntax and semantic values, and represented as an XML schema.

2. The method of claim 1, wherein the format of the meta-model structure into which the non-functional properties of the information of the program module are added includes categories of business constraint, metric determination, quality of service, and price determination.

3. The method of claim 2, wherein a category of business constraint includes conditions to be met for use of the one or more program modules, and the category of metric determination includes consumption measurement of a function of the program module, the category of price includes usage-based and capacity-base consumption models, and the category of quality of service includes a level of availability and performance expected from the program module.

4. The method of claim 1, wherein the analysis of the information of the program module, and the determination of: the description of the function, the one or more license terms, and the non-functional properties of the program module, are performed by a reasoning engine utilizing supervised learning.

5. The method of claim 1, wherein the program module includes an application programming interface (API) of an online service.

6. The method of claim 1, wherein the meta-model structure represents a pattern of license terms from a composite of multiple program modules available as services.

7. The method of claim 1, wherein determining the one or more license terms includes using lookup references to determine terminology and phrases associated with a licensing term of the one or more licensing terms.

8. The method of claim 1, wherein storing, by one or more processors, the information of the program module as a meta-model structure further comprises:
storing the meta-model structure that is generated for the program module to a repository of program modules providing one or more online services, wherein the meta-model structure enables an auto-composition of license terms and non-functional properties of the program module added to a license of the online application.

9. The method of claim 1, wherein determining the object of interest of each license term of the one or more license terms referring to a condition influencing whether a license term of the program module is met, includes overlap of license terms between of multiple program modules.

10. A computer program product for generating a standardized structure containing information regarding a program module available as a service for an application, the computer program product comprising:
a computer readable storage medium having program instructions embodied therewith, wherein the program instructions are executable by a computer processor to cause the computer processor to perform a method comprising:
receiving information regarding the program module, the information of the program module includes a description of a function of the service, one or more license terms, and non-functional properties of the program module;
determining the one or more license terms, the description of the function, and the non-functional properties of the program module, based on an analysis of the information of the program module, wherein the analysis includes a semantic analysis and natural language processing of digitized text included in the information of the program module;

determining an object of interest of each license term of the one or more license terms, wherein the object of interest refers to a condition influencing whether a license term of the program module is met;

identifying an outcome of each license term of the one or more license terms, based on the object of interest and conditions associated with the online application into which the service of the program module is included;

responsive to determining conflict between license terms of the one or more license terms of the program module, applying rules corresponding to compliance of each license term of the one or more license terms of the program module;

generating a meta-model structure for the program module based on a meta-model template that includes the information regarding the program module that is extracted and formatted, wherein the generation of the meta-model structure transforms the one or more license terms of the program module into a standardized syntax and semantic format, and includes a description of the function of the service provided by the program module, and non-functional properties of the one or more license terms of the service, represented in an XML schema; and storing in a repository, the information of the program module as a meta-model structure utilizing the standardized syntax and semantic format and represented in an XML schema.

11. The computer program product of claim 10, wherein the format of the meta-model structure into which the non-functional properties of the information of the program module are added includes one or a combination of categories selected from a group of: business constraint, metric determination, quality of service, and price determination.

12. The computer program product of claim 11, wherein a category of business constraint includes conditions to be met for use of the one or more program modules, and the category of metric determination includes consumption measurement of the function of the program module, the category of price includes usage-based and capacity-base consumption models, and the category of quality of service includes a level of availability and performance expected from the program module.

13. The computer program product of claim 10, wherein the program module includes an application programming interface (API) of an online service.

14. A computer system for generating a standardized structure containing information regarding a program module available as a service for an online application, the computer system comprising:

one or more computer processors;

one or more computer readable storage media; and program instructions stored on the computer readable storage media for execution by at least one of the one or more processors, the program instructions comprising:

program instructions to receive information regarding the program module available as a service, the information of the program module includes a description of a function of the service, one or more license terms, and non-functional properties of the program module;

program instructions to determine the one or more license terms, the description of the function, and the non-functional properties of the program module, based on an analysis of the information of the program module, wherein the analysis includes a semantic analysis and natural language processing of digitized text included in the information of the program module;

program instructions to determine an object of interest of each license term of the one or more license terms, wherein the object of interest refers to a condition influencing whether a license term of the program module is met;

program instructions to identify an outcome of each license term of the one or more license terms, based on the object of interest and conditions associated with the online application into which the service of the program module is included;

responsive to determining conflict between license terms of the one or more license terms of the program module, program instructions to apply rules corresponding to compliance of each license term of the one or more license terms of the program module;

program instructions to generate a meta-model structure for the program module based on a meta-model template that includes the information regarding the program module that is extracted and formatted, wherein the generation of the meta-model structure transforms the one or more license terms of the program module into a standardized syntax and semantic format, and includes a description of the function of the service provided by the program module, and non-functional properties of the one or more license terms of the service, represented as an XML schema; and program instructions to store in a repository, the information of the program as a meta-model structure using the standardized syntax and semantic values, and represented as an XML schema.

15. The computer system of claim 14, wherein meta-model structure into which the non-functional properties of the information of the program module are added includes one or a combination of categories selected from a group of: business constraint, metric determination, quality of service, and price determination.

16. The computer system of claim 15, wherein the category of business constraint includes conditions to be met for use of the one or more program modules, and the category of metric determination includes consumption measurement of a function of the program module, the category of price includes usage-based and capacity-base consumption models, and the category of quality of service includes a level of availability and performance expected from the program module.

17. The computer system of claim 14, wherein the analysis of the information of the program module, and determination of: the description of the function, the one or more license terms, and the non-functional properties, of the program module, are performed by program instructions directed to a reasoning engine utilizing supervised learning.

18. The computer system of claim 14, wherein the program module includes an application programming interface (API) of an online service.

19. The computer system of claim 14, wherein applying rules to resolve conflicts of the one or more license terms includes a reasoning engine which compares the license terms of a set of programming modules to determine which license terms of the set of programming modules over-ride other license terms of the set of programming modules.

\* \* \* \* \*